(12) United States Patent
Nakashima et al.

(10) Patent No.: US 11,237,568 B2
(45) Date of Patent: Feb. 1, 2022

(54) AUTONOMOUS TRAVEL CART

(71) Applicant: KABUSHIKI KAISHA TOYOTA JIDOSHOKKI, Aichi (JP)

(72) Inventors: Takashi Nakashima, Aichi-ken (JP); Taro Kassai, Aichi-ken (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 348 days.

(21) Appl. No.: 16/559,969

(22) Filed: Sep. 4, 2019

(65) Prior Publication Data
US 2020/0081437 A1 Mar. 12, 2020

(30) Foreign Application Priority Data

Sep. 7, 2018 (JP) .............................. JP2018-168024

(51) Int. Cl.
*G05D 1/02* (2020.01)
*G05D 1/00* (2006.01)
(Continued)

(52) U.S. Cl.
CPC .............. *G05D 1/024* (2013.01); *B60W 30/09* (2013.01); *B60W 30/0956* (2013.01); *G05D 1/0088* (2013.01); *G05D 2201/0216* (2013.01)

(58) Field of Classification Search
CPC .. G05D 1/024; G05D 1/0088; B60W 30/0956
See application file for complete search history.

(56) References Cited

U.S. PATENT DOCUMENTS

2011/0166737 A1* 7/2011 Tanaka ................. G05D 1/0274
701/25
2018/0059681 A1* 3/2018 Kuhara ................. A47L 9/2889
(Continued)

FOREIGN PATENT DOCUMENTS

JP 2009-042845 2/2009
JP 2012-59176 3/2012

OTHER PUBLICATIONS

Koren et al.,Potential Field Methods and Their Inherent Limitations for Mobile Robot Navigation, 1991, Proceedings of the 1991 IEEE International Conference on Robotics and Automation, pp. 1398-1404. (Year: 1991).*

(Continued)

*Primary Examiner* — Donald J Wallace
(74) *Attorney, Agent, or Firm* — Greenblum & Bernstein, P.L.C.

(57) ABSTRACT

An autonomous travel cart includes a control device controlling the autonomous travel cart to travel autonomously based on detection information from an obstacle detection device. The control device includes a wall length detection unit that detects wall lengths of wall portions from the autonomous travel cart to an exit end of the narrow path, a wall length determination unit that determines whether or not the wall lengths are greater than a predetermined wall length threshold, and a narrow path travel control unit that controls the autonomous travel cart to travel at a normal speed when the wall lengths are greater than the predetermined wall length threshold, and to decelerate and travel at a predetermined reduced speed when at least one of the wall lengths detected by the wall length detection unit is equal to or less than the predetermined wall length threshold.

4 Claims, 10 Drawing Sheets

(51) Int. Cl.
  *B60W 30/09*   (2012.01)
  *B60W 30/095*  (2012.01)

(56) References Cited

U.S. PATENT DOCUMENTS

2019/0015984 A1*  1/2019  Kim ..................... B25J 9/1679
2019/0361452 A1* 11/2019  Tahir .................... G01S 13/589

OTHER PUBLICATIONS

Borenstein et al., Real-Time Obstacle Avoidance for Fast Mobile Robots, 1989, IEEE Transactions on Systems, Man and Cybernetics, vol. 19, No. 5, pp. 1179-1187. (Year: 1989).*
Extended European Search Report in corresponding European Application No. 19194278.8, dated Oct. 28, 2019.

\* cited by examiner

AUTONOMOUS TRAVEL CART

CROSS-REFERENCE TO RELATED APPLICATION

This application claims priority to Japanese Patent Application No. 2018-168024 filed on Sep. 7, 2018, the entire disclosure of which is incorporated herein by reference.

BACKGROUND ART

The present disclosure relates to an autonomous travel cart.

In recent years, there have been proposed various techniques for utilizing an unattended autonomous travel cart when a cargo is loaded or unloaded in a manufacturing plant, an item delivery center, a parts center, or the like having a plurality of shelves and the like for storing various items (including parts). For example, in the item delivery center, an operator A selects items to be delivered from a large number of items on shelves and places on the autonomous travel cart. After the operator A operates the autonomous travel cart to go to the item collection location, the autonomous travel cart autonomously travels to the item collection location while avoiding obstacles. The autonomous travel cart stops travelling upon arriving at the item collection location.

An operator B stands by at the item collection location and collects the items loaded on the autonomous travel cart. When the operator B operates the autonomous travel cart to return, the autonomous travel cart returns autonomously to a location near the operator A while avoiding the obstacles. Japanese Patent Application Publication No. 2012-59176 discloses a guidance control system of a mobile body that is configured to causes an autonomous travel body along a predetermined travel track by detecting landmarks such as a magnetic mark disposed scattered on the floor surface in order to guide such autonomous travel body.

According to the guidance control system of the mobile body of the above-cited Publication, since a person may move in the exit of the narrow path, i.e., before an entrance of an intersection, the autonomous travel cart needs to decelerate and travel at a reduced speed in the exit of the narrow path, i.e., before the entrance of the intersection. Thus, the autonomous travel cart is configured to decelerate and travel at the reduced speed autonomously by detecting landmarks such as a magnetic mark provided in the floor surface in the narrow path at a position predetermined distance away from the exit of the narrow path.

However, in the guidance control system of the mobile body of the above-cited Publication, it requires a construction work to install landmarks such as magnetic mark in the exit of the narrow path and providing a sensor detecting landmarks such as magnetic mark in the autonomous travel cart, which increases the number of parts. Further, in a case where unexpected obstacles such as a partition arranged at the exit of the narrow path and the narrow path is extended due to the change of the layout of the travel area, the reduced speed travel distance for the autonomous travel cart from the magnetic mark and the travel time to reach the item collection location are increased, with the result that the work efficiency may be reduced. Additionally, it requires a construction work to reset the landmark The present disclosure has been made in view of such problems, and is directed to providing an autonomous travel cart which can safely and quickly pass through an exit of a narrow path, which does not require providing magnetic marks or the like in a floor surface.

SUMMARY

In accordance with an aspect of the present disclosure, there is provided an autonomous travel cart autonomously moving in accordance with a moving route includes an obstacle detection device having a two-dimensional planer obstacle detection flat region where a laser beam is scanned, and outputting a detection information including an obstacle position which is a position of an obstacle in the obstacle detection flat region, and a control device controlling the autonomous travel cart to travel autonomously based on the detection information from the obstacle detection device. The control device includes a surroundings information acquisition unit that acquires a surroundings information around the autonomous travel cart in the front thereof based on the detection information input from the obstacle detection device, an entrance determination unit that determines whether or not the autonomous travel cart has entered a narrow path in which fixed obstacles are disposed on both sides of the autonomous travel cart in the width direction thereof based on the surrounding information acquired by the surrounding information acquisition unit, a wall length detection unit that detects wall lengths of wall portions from the autonomous travel cart to an exit end of the narrow path, the wall portions being formed by the fixed obstacles disposed on the opposite sides in the vehicle width direction, when the entrance determination unit determines that the autonomous travel cart has entered the narrow path, and a wall length determination unit that determines whether or not the respective wall lengths detected by the wall length detection unit are greater than a predetermined wall length threshold. The control device further includes a narrow path travel control unit that controls the autonomous travel cart to travel at a normal speed when the wall length determination unit determines that the wall lengths detected by the wall length detection unit are greater than the predetermined wall length threshold, and controls the autonomous travel cart to decelerate and travel at a predetermined reduced speed when the wall length determination unit determines that at least one of the wall lengths detected by the wall length detection unit is equal to or less than the predetermined wall length threshold.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The disclosure together with objects and advantages thereof may best be understood by reference to the following description of the presently preferred embodiments together with the accompanying drawings in which.

DETAILED DESCRIPTION OF THE EMBODIMENTS

Figure 13:
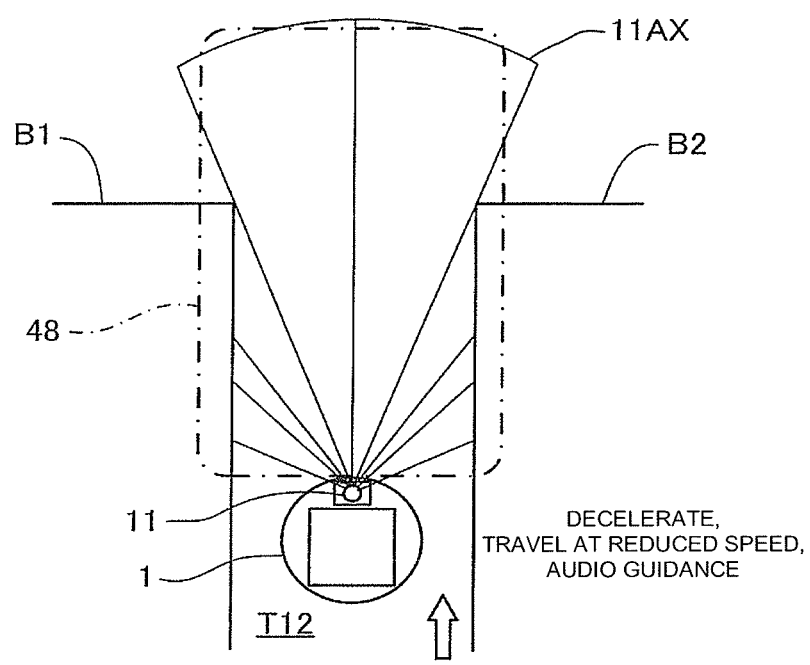
FIG. 13 is a view for explaining an example in which the autonomous travel cart travels the narrow path when a deceleration range is set at an end of the narrow path of the designated area map information.
Figure 14:
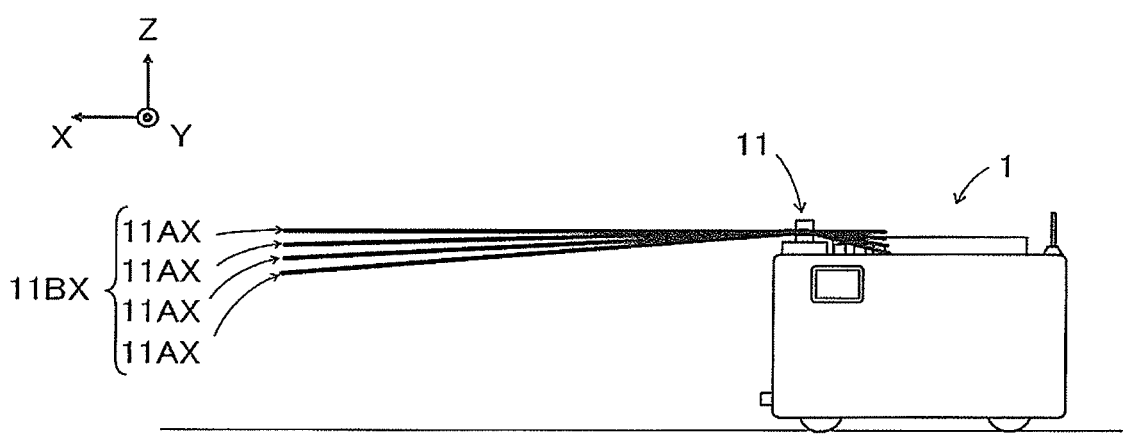
FIG. 14 is a side view for explaining an example of a three-dimensional obstacle detection solid region.

Hereinafter, an autonomous travel cart according to the present disclosure will be described with reference to drawings in detail. In the drawing in which a X-axis, a W-axis, and a Y-axis are described, the X-axis, the W-axis and the Y-axis are orthogonal to each other. The Z-axis direction indicates a vertically upward direction, the X-axis direction indicates a forward direction of the autonomous travel cart 1, and the Y-axis direction indicates a left direction of the autonomous travel cart. In the drawing in which a U-axis, a V-axis, and a W-axis are described, the U-axis, the V-axis and the W-axis are orthogonal to each other. The W-axis direction indicates a vertically upward direction, represents a depth direction from a far side toward a front side with respect to a viewer of the FIG. 13. The V-axis represents a rightward direction in a width direction of the designated area.

[Appearance of Autonomous Travel Cart (FIG. 1) and Overall Configuration (FIG. 2)]

Figure 1:
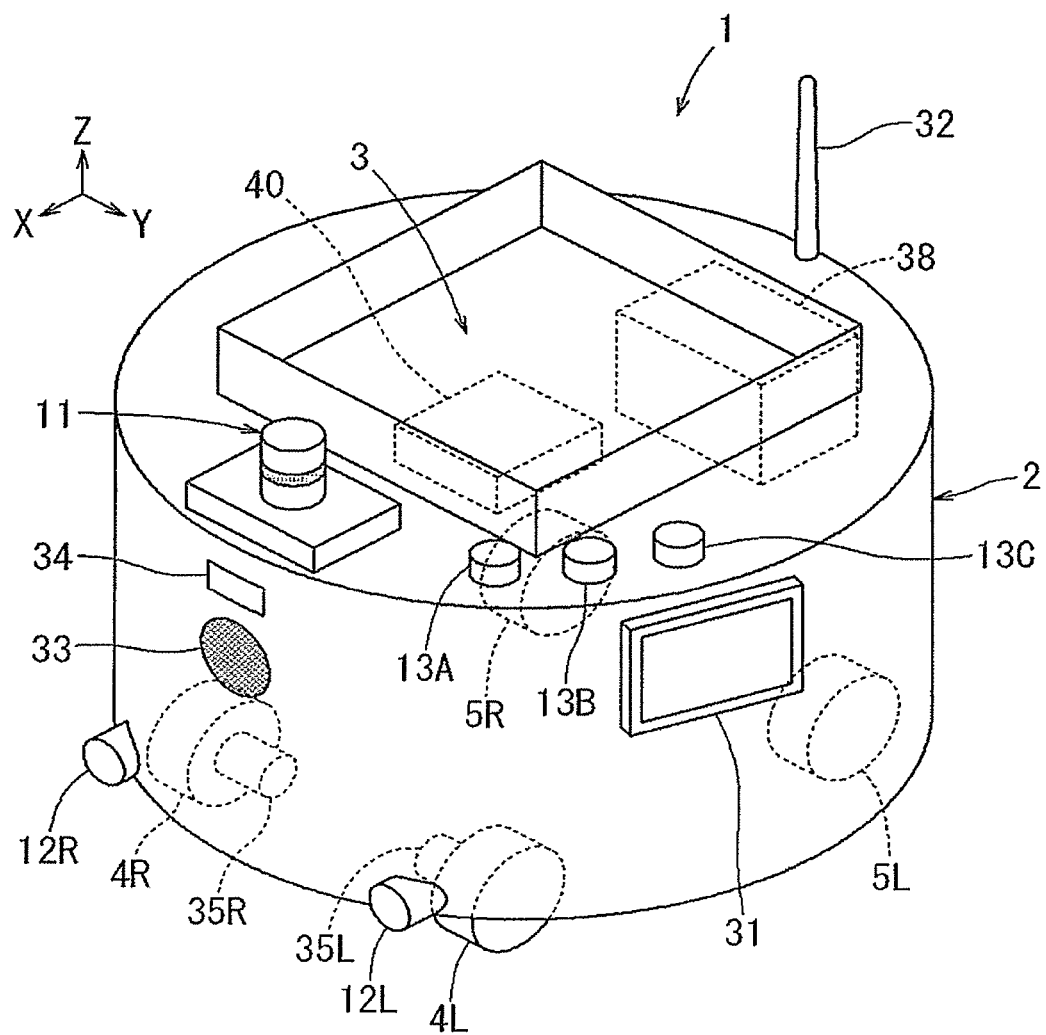
FIG. 1 is a perspective view showing an example of an external appearance of an autonomous travel cart according to the present embodiment.
Figure 2:
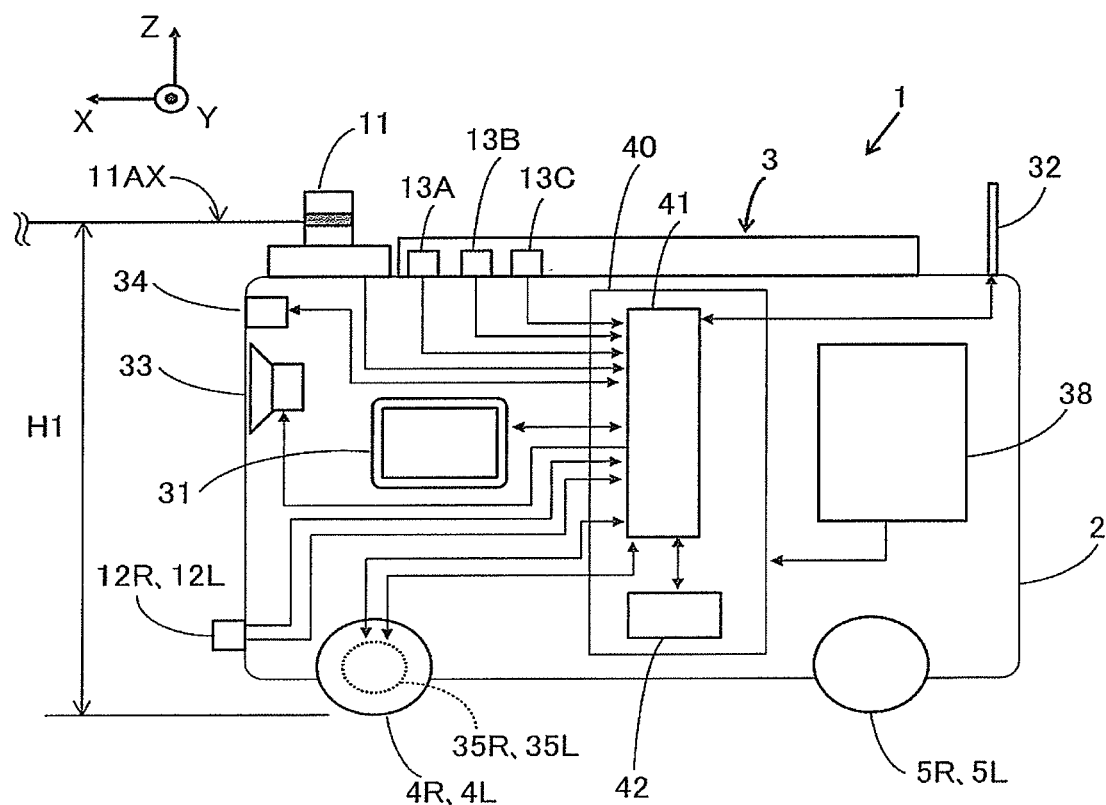
FIG. 2 is a schematic view illustrating an entire configuration of the autonomous travel cart.

The following will describe a schematic configuration of an autonomous travel cart 1 with reference to FIGS. 1 and 2. Although the autonomous travel cart 1 may be formed in various shapes (appearance) depending on the use and the work site, as shown in FIG. 1, the autonomous travel cart 1 having a columnar shape with a predetermined diameter (e.g., a diameter of about 65 cm) will be described as an example in the description of the present embodiment. As shown in FIGS. 1 and 2, the autonomous travel cart 1 has a body 2, a loading platform 3, a right drive wheel 4R, a left drive wheel 4L, a right caster wheel 5R, a left caster wheel 5L, an obstacle detection device 11, a right floor surface detection device 12R, a left floor surface detection device 12L, a main switch 13A, a dispatch switch 13B, a return switch 13C, a touch monitor 31, an antenna 32, an audio output device 33, a communication connector 34, a right motor 35R, a left motor 35L, a control circuit 40, a battery 38, and the like.

As shown in FIG. 1, the body 2 has a columnar shape, and has the loading platform 3 disposed on a top surface of the body 2 on which items are placed. The autonomous travel cart 1 travels autonomously to deliver items placed on the loading platform 3.

The right drive wheel 4R is disposed at a position of a front right wheel of the autonomous travel cart 1. A direction of the right drive wheel 4R is fixed to a straight-travel direction. The left drive wheel 4L is disposed at a position of a front left wheel of the autonomous travel cart 1. A direction of the right drive wheel 4R is fixed to a straight-travel direction. The left drive wheel 4L is driven to rotate in the forward direction or the backward direction by the left motor 35L. As shown in FIG. 2, an electronic control unit 41 (ECU 41) (control device) may control the right motor 35R and the left motor 35L separately and operate the autonomous travel cart 1 such that the autonomous travel cart 1 travels straight forward or backward, turns to right or left and travels forward, or pivot right or left, for example. It is noted that the autonomous travel cart 1 includes at least one drive wheel and a steering device configured to steer the autonomous travel cart 1, e.g., turning right and left in a plurality of wheels.

The right caster wheel 5R is a driven wheel which is disposed at a position of a rear right wheel of the autonomous travel cart 1 and whose direction is freely changed. The left caster wheel 5L is a driven wheel, which is, disposed at a position of a left rear wheel of the autonomous travel cart 1 and whose direction is freely changed. The directions of the right caster wheel 5R and the left caster wheel 5L are changed depending on the movement of the autonomous travel cart 1, e.g., straight forward or backward movement, turning right or left while moving forward, or pivotal turning right or left, for example.

The obstacle detection device 11 is disposed at a front upper end of the autonomous travel cart 1. The obstacle detection device 11 is, for example, an obstacle sensor (Laser Range Finder sensor), and has a two-dimensional planar obstacle-detection flat region where a laser beam is scanned. The obstacle detection device 11 outputs detection information to the ECU 41 (see FIG. 2). The detection information includes obstacle positions that are positions of obstacles within the planar obstacle-detection region. The detail of the obstacle detection device 11 will be described later.

The right floor surface detection device 12R is, for example, an ultrasonic sensor, detects an obstacle on a floor surface in front of the right drive wheel 4R, and outputs floor surface detection information to the ECU 41 (see FIG. 2). Similarly, the left floor surface detection device 12L is, for example, an ultrasonic sensor, detects an obstacle on the floor surface in front of the left drive wheel 4L, and outputs floor surface detection information to the ECU 41 (see FIG. 2).

The main switch 13A is operated by an operator to start and stop the control circuit 40. The dispatch switch 13B is operated by an operator A (see FIG. 4) being at a position in an actual designated area to instruct the autonomous travel cart 1, located at an arbitrary position in the actual designated area, to travel autonomously to a target arrival position PT, e.g., an item collection location (see FIG. 4), set in the actual designated area (and in designated area map information).

Figure 4:
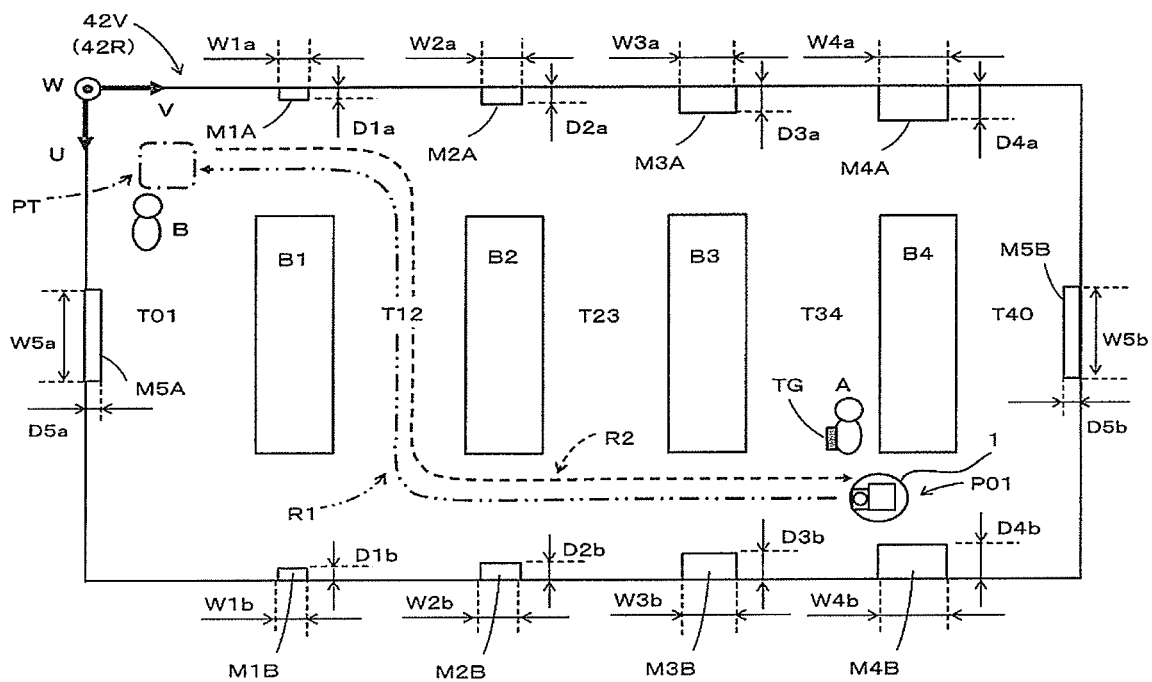
FIG. 4 is a view for explaining an example of designated area map information and an example of using the autonomous travel cart in a designated area.
Figure 5:
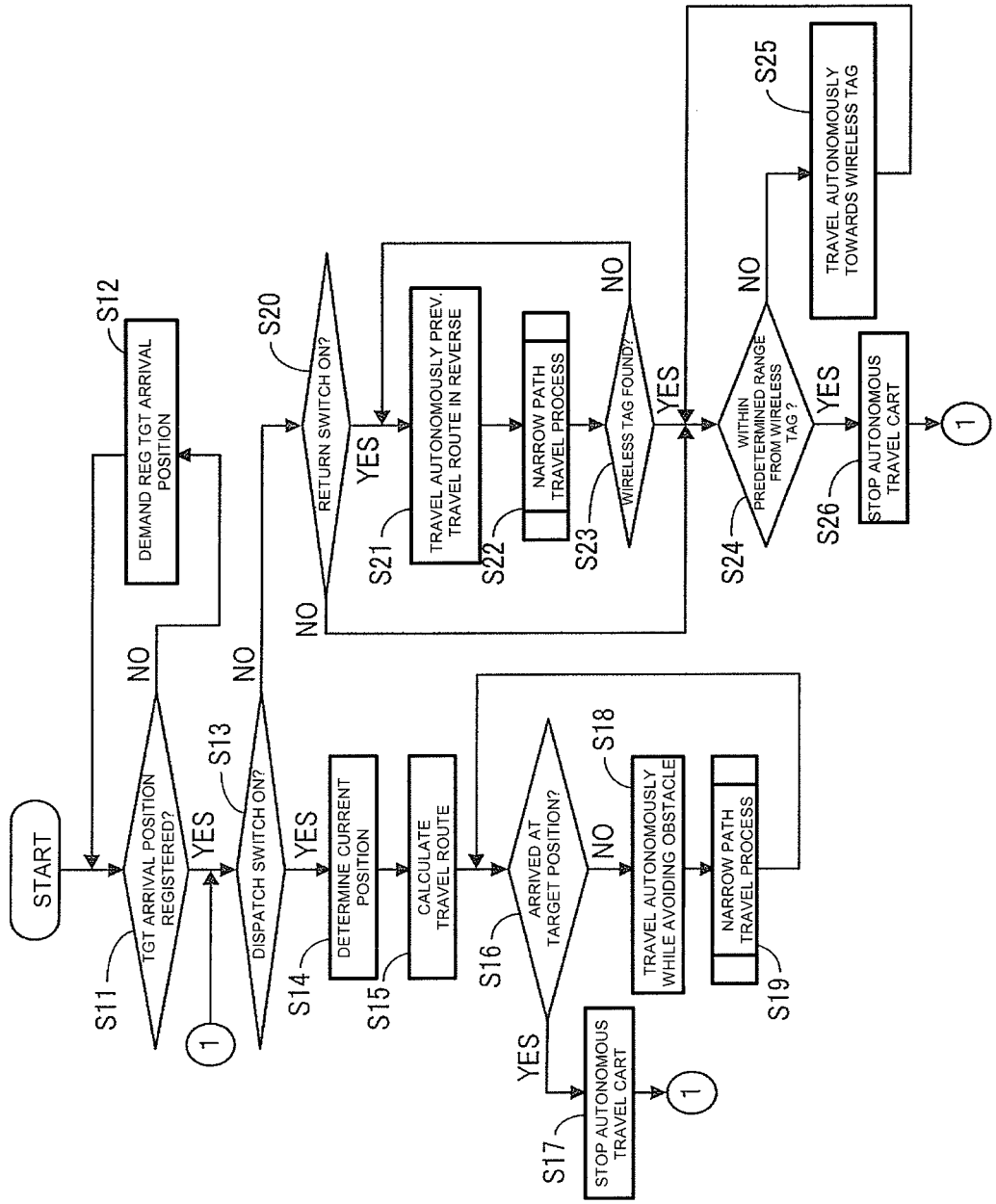
FIG. 5 is a flowchart for explaining an example of a process procedure of an ECU of the autonomous travel cart.

The return switch 13C is a switch operated by an operator B (see FIG. 4) being at the target arrival position PT in the actual designated area to instruct the autonomous travel cart 1, located at the target arrival position PT in the actual designated area, to travel back autonomously to a place in the actual designated area where the operator A (see FIG. 4)

is. It is noted that the dispatch switch 13B and the return switch 13C cannot be turned ON at the same time, and when an operator turns on the switches, the ON-state is maintained until it is released by the operator.

The touch monitor 31 is configured to display a state of the autonomous travel cart 1 such as operating state and battery charge remaining, and is configured to receive inputs from operators. The antenna 32 is configured to perform wireless transmission and reception to search for a wireless tag TG of the operator A in the designated area. The ECU 41 is configured to search for the wireless tag TG by transmitting a response request signal to the wireless tag TG via the antenna 32 and by receiving a response signal from the wireless tag TG within an effective range via the antenna 32. The audio output device 33 is, for example, a speaker and outputs a voice, music, or the like for notifying that the autonomous travel cart 1 traveling autonomously is approaching an exit of a narrow path, an operator, or the like.

The communication connector 34 is a connector for connecting a personal computer or the like for transmitting or receiving various data or the like to or from the ECU 41. For example, an operator may store the designated area map information (information indicating the positions of obstacles in the actual designated area) stored in the personal computer in a storage device 42 (see FIG. 2) via the communication connector 34. The battery 38 is a power source to supply power to devices such as the control circuit 40 in the autonomous travel cart 1, the detection devices 11, 12R, and 12L, and the like.

As shown in FIG. 2, the control circuit 40 includes the ECU 41 (control device), the storage device 42 (e.g., HDD, or hard disk drive), and the like. The ECU 41 is provided by a known electric control unit provided with a CPU, a RAM, a ROM, a timer, a backup RAM, and the like (not shown). The CPU executes various arithmetic processing based on various programs and parameters stored in the ROM. The RAM temporarily stores calculation results of the CPU, data input from the detection devices, and the like, and the backup RAM stores, for example, data to be stored when the autonomous travel cart 1 is at a stop.

The ECU 41 receives, for example, the detection information from the obstacle detection device 11, the floor surface detection information from the right floor surface detection device 12R and the left floor surface detection device 12L, and operational signals from the main switch 13A, the dispatch switch 13B, and the return switch 13C. Further, for example, the ECU 41 reads and writes data from and to the storage device 42, transmits and receives data and signals via the antenna 32, outputs and inputs to and from the touch monitor 31, and outputs a drive signal to the right motor 35R and the left motor 35L.

[Detection Region of the Obstacle Detection Device]

Figure 3:
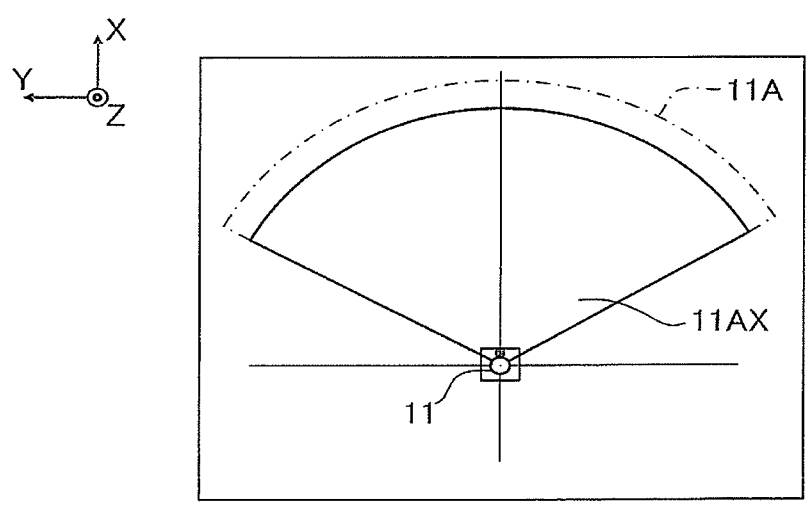
FIG. 3 is a view for explaining an example of setting a desired detection region in a maximum detection region with respect to an obstacle detection device.

The following will describe a detection region where the obstacle detection device 11 detects an obstacle with reference to FIGS. 2 and 3. FIG. 3 shows a state in which a desired detection region (obstacle detection flat region 11AX) is designated in a maximum detection region 11A of the obstacle detection device 11 using a personal computer or the like.

As shown in FIG. 3, the obstacle detection device 11 has the two-dimensional planar obstacle detection flat region 11AX (a designated region in FIG. 3) where it is scanned with a laser beam and outputs the detection information, including an obstacle position which is a position of an object (obstacle) detected in the obstacle detection flat region 11AX, to the ECU 41 (see FIG. 2). Thus, the detection information includes information on in which direction and how far the object (obstacle) is located.

The maximum detection region 11A which is the maximum range of the obstacle detection flat region 11AX of the obstacle detection device 11 has, for example, a fan shape having a radius of about 10 meter (m) and a central angle of about 120 degree. A plurality of the obstacle detection flat regions 11AX can set (stored) in advance in the obstacle detection device 11 or the control circuit 40. An operator creates a plurality of patterns of the obstacle detection flat regions 11AX and stores the created obstacle detection flat regions 11AX in the obstacle detection device 11 or the control circuit 40 (storage device 42) and can switch the obstacle detection flat region 11AX from the control circuit 40.

For example, as shown in FIG. 3, the operator starts a program for creating a detection region on a personal computer or the like and creates (selects) a desired obstacle detection flat region 11AX. Then, the operator stores the obstacle detection flat region 11AX, selected through the personal computer or the like, in the obstacle detection device 11 or the control circuit 40 (storage device 42) via the communication connector 34.

As shown in FIGS. 2 and 3, the obstacle detection device 11 disposed at the front upper end of the autonomous travel cart 1 detects the distance and the direction to an obstacle in the obstacle detection flat region 11AX, which extends horizontally in a range of the height from a floor surface to at a height H1. For example, while the autonomous travel cart 1 is traveling, the obstacle detection device 11 emits a laser beam whose distance is about 10 meter in a fan-shaped range having the central angle of about 240 degrees, at intervals of the central angle of 0.25 degrees at predetermined time intervals. Then, the obstacle detection device 11 measures the distance and direction from a laser beam irradiation port to a spot where each laser beam has hit an obstacle, as the distance and a direction to the surrounding obstacle positioned frontward of the position of the autonomous travel cart 1. Such measurement results correspond to the surroundings information around the autonomous travel cart 1 in the front thereof in the traveling direction.

[Example of Designated Area Map Information]

The operator can create the designated area map information, indicating the position of an obstacle known in advance in the actual designated area where the autonomous travel cart 1 travels autonomously using a personal computer or the like, and stores the created designated area map information in the control circuit 40 (storage device 42) (see FIG. 2) in advance via the communication connector 34.

FIG. 4 shows an example of designated area map information 42V in a case where the actual designated area is a work site of an item delivery center. The designated area map information 42V is a plan view of the actual designated area (work site), and indicates the position of an obstacle known in advance. In the designated area map information 42V, the U-axis, the V-axis and the W-axis are orthogonal to each other. The W-axis direction indicates the vertically upward direction, the U-axis direction indicates the direction toward the front in the depth direction of an actual designated area, and the V-axis direction indicates the right direction in the width direction of the actual designated area.

The obstacles known in advance in the designated area map information 42V shown in FIG. 4 are wall surfaces on the four sides, shelves B1 to B4 on which various items are placed, and mark obstacles M1A to M5A and M1B to M5B of different sizes, which are arranged on the wall surfaces. The shelves B1 to B4 are arranged at positions away from the wall surfaces, and are arranged at appropriate intervals for operators and the autonomous travel cart 1 to enter. A space between the wall surface and each of the shelves B1 to B4 is a passage through which the autonomous travel cart 1 can travel. Narrow paths T12, T23, and T34 are formed between the adjacent shelves B1 to B4, and the autonomous travel cart 1 can travel through these passages.

The mark obstacles M1A to M5A and M1B to M5B are obstacles serving as marks for the autonomous travel cart 1 to determine a current position of the autonomous travel cart 1, and are set to different widths (Wxx) and different depths (Dxx). For example, even in a case where the autonomous travel cart 1 is at a position close to two shelves and it is difficult to determine the position of the autonomous travel cart 1, more specifically, in a case in which it is difficult to determine that the autonomous travel cart 1 is located in the position close to the shelves B1 and B2, to the shelves B2 and B3, or the position close to the shelves B3, the precise current position of the autonomous travel cart 1 may be easily determined if any one of the mark obstacles M1A to M5A and M1B to M5B.

[Example of Method of Using the Autonomous Travel Cart 1]

The following will describe an example of a method of using the autonomous travel cart 1 when the work site of the item delivery center shown by the designated area map information 42V is set as an actual designated area with reference to FIG. 4. The following (1) to (7) are repeated in the actual designated area 42R, and the autonomous travel cart 1 travels autonomously between the operator A who works at any position and the operator B who is at a target arrival position PT (item collection location).

(1) The operator A carries the wireless tag TG, and the autonomous travel cart 1 detects the wireless tag TG, and follows the operator A so as to be within a predetermined range from the detected wireless tag TG.

(2) The operator A selects items to be delivered from a large number of items placed on the shelves B1 to B4 while moving between the shelves B1 to B4, and places the selected items on the loading platform 3 of the autonomous travel cart 1.

(3) When the amount of the items placed on the loading platform 3 of the autonomous travel cart 1 reaches a suitable quantity, the operator A instructs the autonomous travel cart 1 to travel autonomously to the target arrival position PT (item collection location). In other words, the operator A sets the dispatch switch 13B (see FIGS. 1 and 2) ON.

(4) The autonomous travel cart 1 on which the items are placed travels autonomously toward the target arrival position PT (item collection location), for example, along a travel route R1 while avoiding obstacles in the actual designated area 42R, and stops upon arriving at the target arrival position PT (item collection location). The target arrival position PT (item collection location) is a position designated in the actual designated area 42R in advance, and the operator B stands by at the target arrival position PT (item collection location).

(5) The operator B receives items from the autonomous travel cart 1 that is stopped at the target arrival position PT (item collection location) and instructs the autonomous travel cart 1 to travel back (return) autonomously to a place where the operator A is. Thus, the operator B cancels "ON" of the dispatch switch 13B and turns "ON" the return switch 13C (see FIGS. 1 and 2).

(6) The autonomous travel cart 1 with no item loaded on the loading platform 3 travels autonomously to the place where the operator A is for the next transport of the items, while avoiding obstacles, for example, along a travel route R2 in the actual designated area 42R, and stops when it reaches within a predetermined range from the operator A (from the wireless tag TG).

(7) The operator A cancels the autonomous travel instruction. That is, the operator A cancels "ON" of the return switch 13C. Then, the process returns to (1).

[Process of the ECU 41 of the autonomous travel cart 1]

The following will describe a process executed by the ECU 41 of the autonomous travel cart 1 that achieves the method of using the autonomous travel cart 1 including (1) to (7) with reference to FIGS. 5 to 12. For example, when the main switch 13A (see FIGS. 1 and 2) is operated, the ECU 41 starts the process shown in FIG. 5, and the process proceeds to Step S11.

At Step S11, the ECU 41 reads the designated area map information 42V stored in the storage device 42, and determines whether or not the target arrival position PT (see FIG. 4) is registered in the read designated area map information 42V. When it is determined that the target arrival position PT is not registered (NO at Step S11), the ECU 41 proceeds to Step S12. At Step S12, the ECU 41 demands the registration of the target arrival position PT, and then executes Step S11 and subsequent steps again.

For example, at Step S12, the ECU 41 displays the designated area map information 42V on the touch monitor 31 (see FIGS. 1 and 2), and displays "Please touch the location of the desired target arrival position". Then, the ECU 41 reads the touched position and registers the position as the target arrival position PT.

When it is determined that the target arrival position PT is registered at Step S11 (YES at Step S11), on the other hand, the ECU 41 proceeds to Step S13. At Step S13, the ECU 41 determines whether or not the dispatch switch 13B (see FIGS. 1 and 2) is turned ON by the operator A (see FIG. 4). When it is determined that the dispatch switch 13B is turned ON by the operator A (YES at Step S13), the ECU 41 proceeds to Step S14.

At Step S14, the ECU 41 determines a current position P01, which is a position of the autonomous travel cart 1 in the actual designated area 42R (and in the designated area map information 42V), based on the obstacle position included in the detection information from the obstacle detection device 11 and the designated area map information 42V stored in the storage device 42, and proceeds to Step S15.

Figure 7:
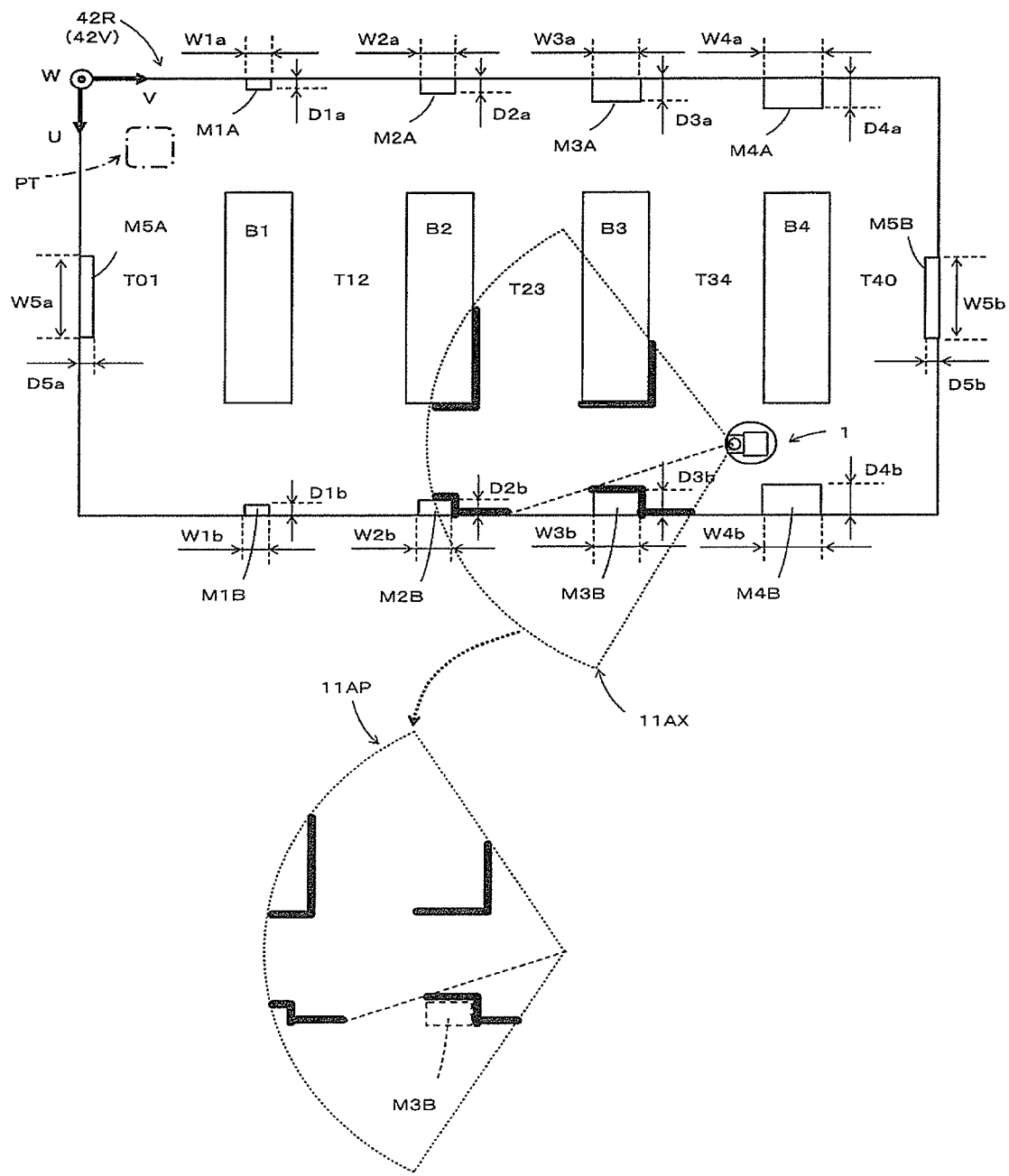
FIG. 7 is a view for explaining an example of an acquired obstacle position in the designated area.

For example, as shown in FIG. 7, in the actual designated area 42R, the autonomous travel cart 1 scans an obstacle in the obstacle detection flat region 11AX to obtain an obstacle position 11AP. The ECU 41 compares the obstacle position 11AP (see FIG. 7) included in the detection information with the designated area map information 42V (see FIG. 4) read from the storage device 42 using pattern matching or the like to obtain a position matching the obstacle position 11AP (see FIG. 7) in the designated area map information (see FIG. 4), and determine the obtained position as the current position. In the example shown in FIG. 7, the ECU 41 determines the current position P01 in the designated area map information 42V shown in FIG. 4 by detecting of the mark obstacle M3B.

Subsequently, at Step S15, as shown in FIG. 4, the ECU 41 determines the travel route R1 from the current position P01 to the target arrival position PT while avoiding obstacles, based on the designated area map information 42V, the current position P01 determined at Step S14, and the target arrival position PT registered in the designated area map information 42V, stores the travel route R1 in the storage device 42, and then proceeds to Step S16. At Step S16, the ECU 41 determines whether or not the current position P01 in the designated area map information 42V reaches the target arrival position PT (whether or not the current position P01 is within a predetermined range from the target arrival position PT).

When it is determined that the current position P01 in the designated area map information 42V is within the target arrival position PT (YES at Step S16), the ECU 41 proceeds to Step S17. At Step S17, the ECU 41 stops driving of the right motor 35R and the left motor 35L to stop traveling of the autonomous travel cart 1, and executes Step S13 and subsequent Steps again. When the autonomous travel cart 1 reaches the target arrival position PT and stops (at Step S17), the operator B shown in FIG. 4 receives the items placed on the loading platform 3, cancels ON of the dispatch switch 13B, and turns the return switch 13C ON.

When it is determined that the current position P01 in the designated area map information 42V is not within the target arrival position PT at Step S16 (NO at Step S16), on the other hand, the ECU 41 proceeds to Step S18. At Step S18, the ECU 41 travels autonomously at a normal speed (e.g., about 4 km/h) along the travel route R1 (see FIG. 4) by controlling the right motor 35R and the left motor 35L while updating the current position P01 in the designated area map information 42V and avoiding obstacles, and proceeds to Step S19. At Step S19, the ECU 41 executes the sub-processing of the "narrow path travel process", which will be described later, and then executes Step 16 and the subsequent Steps again.

When it is determined that the dispatch switch 13B is not turned ON by the operator A at Step S13, that is, when it is determined that ON of the dispatch switch 13B is cancelled (NO at Step S13), the ECU 41 proceeds to Step S20. At Step S20, the ECU 41 determines whether or not the return switch 13C (see FIGS. 1 and 2) is turned ON by the operator B (see FIG. 4). When it is determined that the return switch 13C is turned ON by the operator B (YES at Step S20), the ECU 41 proceeds to Step S21.

At Step S21, the ECU 41 reads the previous travel route R1 stored in the storage device 42, obtains the travel route R2 (see FIG. 4) from the target arrival position PT to the current position P01 obtained at Step S14 by following this travel route R1 in reverse, and stores the travel route R2 in the storage device 42. Subsequently, the ECU 41 travels autonomously at a normal speed (for example about 4 km/h) along the travel route R2 (see FIG. 4) by controlling the right motor 35R and the left motor 35L while updating the current position P01 in the designated area map information 42V and avoiding obstacles, and proceeds to Step S22. At Step S22, the ECU 41 executes the sub-process of the "narrow path travel process", which will be described later, and then proceeds to Step S23.

At Step S23, the ECU 41 determines whether the wireless tag TG (see FIG. 4) is found (detected). When it is determined that the wireless tag TG is not found (detected) (NO at Step S23), the ECU 41 executes Step S21 and the subsequent Steps again. During the autonomous travelling of the autonomous travel cart 1, the ECU 41 may find the wireless tag TG by transmitting a response request signal to the wireless tag TG wirelessly and receiving a response signal from the wireless tag TG wirelessly via the antenna 32 (see FIGS. 1 and 2).

On the other hand, when it is determined that the wireless tag TG has been found (detected) (YES at Step S23), the ECU 41 proceeds to Step S24. At Step S24, the ECU 41 determines whether or not the current position of the autonomous travel cart 1 is within a predetermined range (e.g., within a radius of 1 meter) from the wireless tag TG based on the radio wave intensity and the like from the wireless tag TG. When it is determined that the current position of the autonomous travel cart 1 is not within the predetermined range from the wireless tag TG (NO at Step S24), the ECU 41 proceeds to Step S25.

At Step S25, the ECU 41 causes the autonomous travel cart 1 to travel autonomously towards the found wireless tag TG at a normal speed (e.g., about 4 km/h) while updating the current position P01 in the designated area map information 42V and avoiding obstacles, and, then, executes Step S24 and the subsequent Steps again.

When it is determined that the current position of the autonomous travel cart 1 is within the predetermined range from the wireless tag TG (YES at Step S24), on the other hand, the ECU 41 proceeds to Step S26. At Step S26, the ECU 41 stops traveling of the autonomous travel cart 1 by stopping driving of the right motor 35R and the left motor 35L_ and, then, executes Step S13 and the subsequent Steps again. It is noted that the operator A cancels ON of the return switch 13C when the autonomous travel cart 1 returns to the place where the operator A shown in FIG. 4 is and then stops (At Step S26).

In a case where it is determined that the return switch 13C is not turned ON by the operator B at Step S20, that is, when it is determined that ON of the return switch 13C is cancelled (NO at Step S20), the ECU 41 executes Step S24 and the subsequent Steps. In other words, the autonomous travel cart 1 travels to a position within a predetermined range (e.g., within a radius of 1 meter) from the wireless tag TG and stops. Accordingly, the autonomous travel cart 1 travels following the operator A who carries the wireless tag TG and stops at a position within a predetermined range (e.g., within a radius of 1 meter).

Thus, the operator A shown in FIG. 4 selects items, which are desired to be transported to the target arrival position PT, from the shelves B3 and B4 and places the selected items on the loading platform 3 of the autonomous travel cart 1 following the operator A. After a suitable quantity of the items placed on the autonomous travel cart 1, the operator A turns the dispatch switch 13B ON. In other words, the operator A instructs the autonomous travel cart 1 to travel autonomously to the target arrival position PT (item collection location). Thus, the autonomous travel cart 1 executes autonomous travel to the target arrival position PT (item collection location) again.

[Details of the Narrow Path Travel Process]

Figure 6:
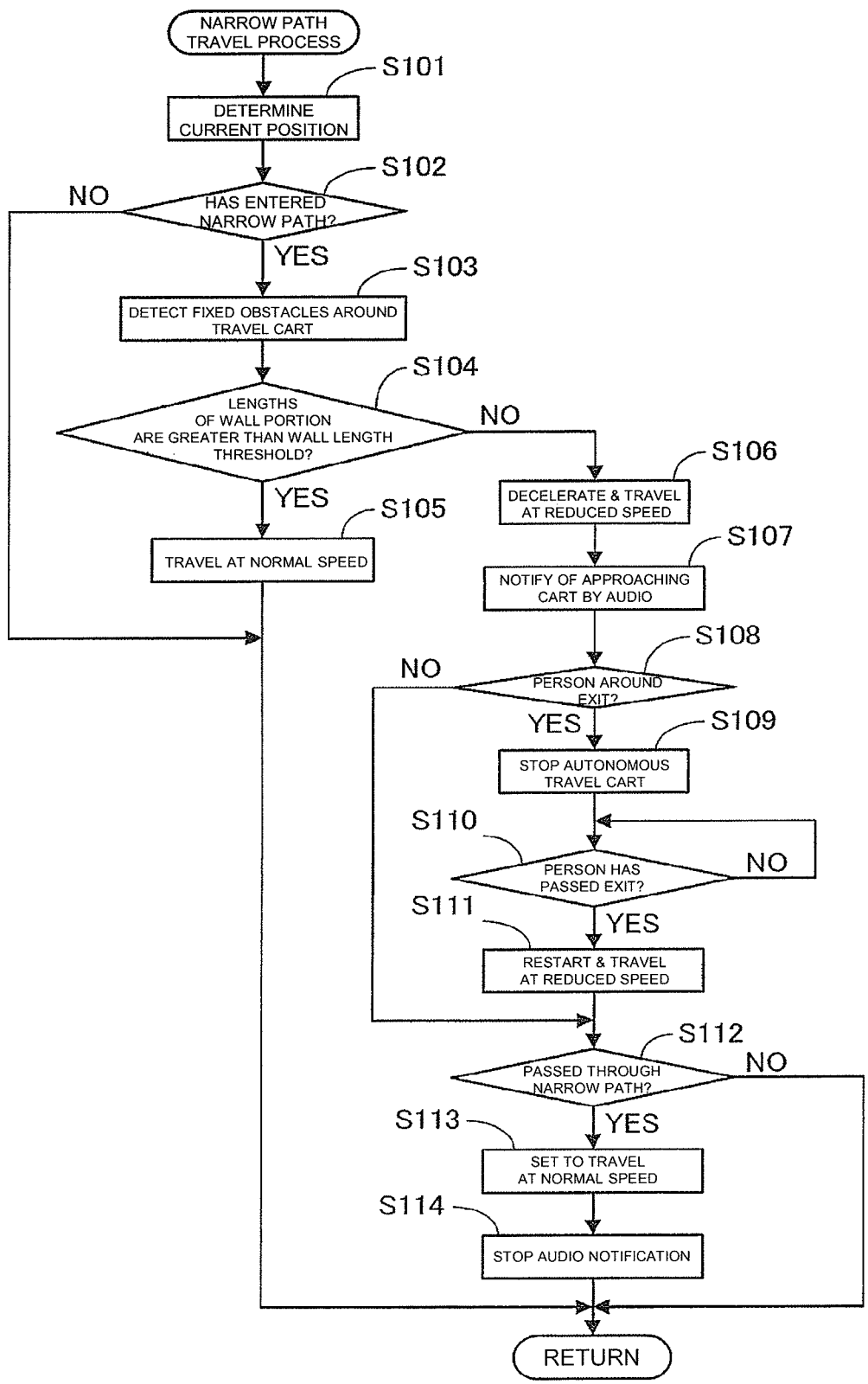
FIG. 6 is a sub-flowchart showing an example of sub-process of "narrow path travel process" of FIG. 5.

The following will describe the narrow path travel process executed by the ECU 41 at Steps S19 and S22 with reference to FIG. 6. As shown in FIG. 6, at Step S101, the ECU 41 determines the current position P01, which is a position of the autonomous travel cart 1 in the actual designated area 42R (and in the designated area map information 42V), based on the obstacle position included in the detection information from the obstacle detection device 11 and the designated area map information 42V stored in the storage device 42, similarly to Step S14, and proceeds to Step S102.

At Step S102, the ECU 41 determines whether or not the current position P01 in the actual designated area 42R (and in the designated area map information 42V) is located in a narrow path T12 (see FIG. 4) in which the shelves B1 and B2 (fixed obstacles) are arranged on both sides of the autonomous travel cart 1 in a vehicle width direction thereof along the travel routes R1 and R2 (see FIG. 4). That is, the ECU 41 determines whether or not the autonomous travel cart 1 has entered the narrow path T12. In other words, the ECU 41 serves as the entrance determination unit of the present disclosure. When it is determined that the current position P01 is not located in the narrow path T12 in which the shelves B1 and B2 (fixed obstacles) are arranged on both sides of the autonomous travel cart 1 in a vehicle width direction thereof along the travel routes R1 and R2, that is, when it is determined that the autonomous travel cart 1 has not entered the narrow path T12 (NO at Step S102), the ECU 41 ends the sub-process, and returns to the main process.

When it is determined that the current position P01 is located in the narrow path T12 in which the shelves B1 and B2 (fixed obstacles) are disposed on both sides of the autonomous travel cart 1 in the vehicle width direction thereof along the travel routes R1 and R2, that is, when it is determined that the autonomous travel cart 1 has entered the narrow path T12 (YES at Step S102), the ECU 41 proceeds to Step S103. At Step S103, the ECU 41 generates surroundings information of a fan-shaped range having a radius of about 10 meter and a central angle of about 120 degrees in front of the autonomous travel cart 1, from the detection information input from the obstacle detection device 11. Then, based on such surroundings information, the ECU 41 calculates wall lengths L of wall portions F1 and F2 from the autonomous travel cart 1 to an exit end of the narrow path T12. In other words, the ECU 41 serves as the wall length detection unit of the present disclosure. The wall portions F1 and F2 are located on the front side of the autonomous travel cart 1 and formed on both sides of the autonomous travel cart 1 in the vehicle width direction thereof by the shelves B1, B2 (fixed obstacles). At Step S103, the ECU 41 detects the fixed obstacles disposed around the autonomous travel cart 1. In other words, the ECU 41 corresponds to the surroundings information acquisition unit of the present disclosure.

Subsequently, at step S104, the ECU 41 determines whether or not each of the wall lengths L of the wall portions F1 and F2, which are located on both sides of the autonomous travel cart 1 in the vehicle width direction thereof and on the front side of the autonomous travel cart 1, and formed by the shelves B1, B2 (fixed obstacles), from the autonomous travel cart 1 to the exit end of the narrow path T12 is greater than a predetermined wall length threshold LS (for example, about 5 meter). In other words, the ECU 41 serves as the wall length determination unit of the present disclosure. When it is determined that each of the wall lengths L of the wall portions F1 and F2 from the autonomous travel cart to the exit end of the narrow path T12 is greater than the predetermined wall length threshold LS (for example, about 5 meter) (YES at S104), the ECU 41 proceeds to step S105.

At Step S105, the ECU 41 causes (controls) the autonomous travel cart 1 to travel autonomously at a normal speed (e.g., about 4 km/h) along the travel route R1, or R2 (see FIG. 4) by controlling the right motor 35R and the left motor 35L while avoiding the shelves B1, B2 (fixed obstacles), ends the sub-process, and returns to the main process. It is noted that the normal speed (e.g., about 4 km/h) is stored in the ROM of the ECU 41, or the storage device 42.

Figure 8:
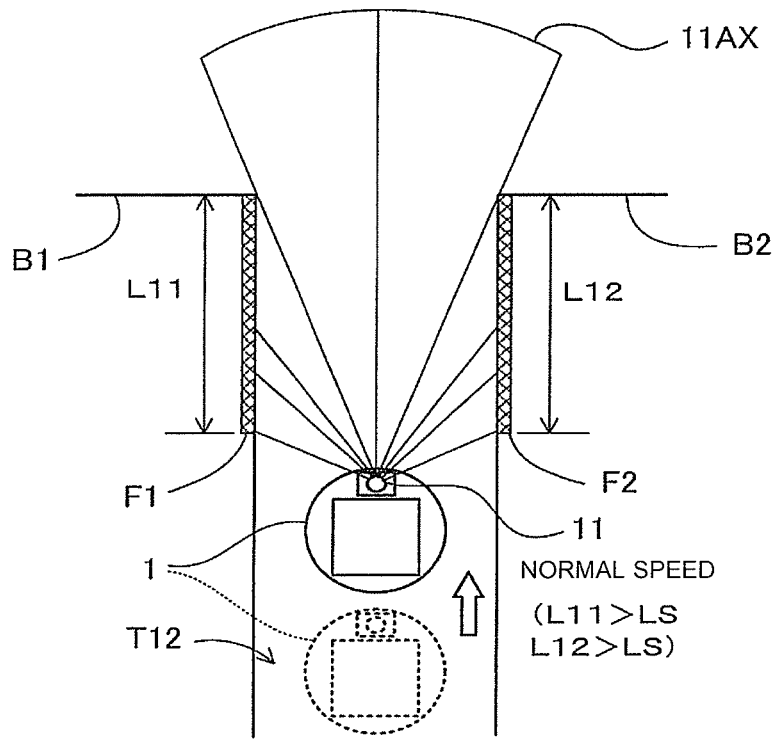
FIG. 8 is a view for explaining an example in which the autonomous travel cart travels a narrow path.

For example, as shown in FIG. 8, the ECU 41 generates the surroundings information of a fan-shaped range having a radius of about 10 meter and a central angle of about 120 degrees on the front side of the autonomous travel cart 1, including information of the shape of the shelves B1, B2 (fixed obstacles) from the detection information of the obstacle detection flat region 11AX input from the obstacle detection device 11. Then, based on the surroundings information, the ECU 41 calculates the wall lengths L11, L12 of the respective wall portions F1, F2, which are located on both sides of the autonomous travel cart 1 in the vehicle width direction thereof and on the front side of the autonomous travel cart 1, and formed by the shelves B1, B2 (fixed obstacles), from the autonomous travel cart 1 to the exit end of the narrow path T12.

Subsequently, the ECU 41 determines that the wall lengths L11, L12 of the respective wall portion F1, F2, which are located on both sides of the autonomous travel cart 1 in the vehicle width direction thereof and on the front side of the autonomous travel card, and formed by the shelves B1, B2 (fixed obstacles), from the autonomous travel cart 1 to the exit end of the narrow path T12 are greater than the predetermined wall length threshold LS (e.g., 5 meter). As a result, the ECU 41 causes the autonomous travel cart 1 to travel autonomously at the normal speed (e.g., about 4 km/h) by controlling the right motor 35R and the left motor 35L while updating the current position P01 in the narrow path T12 and avoiding the shelves B1, B2 (fixed obstacles).

Figure 11:
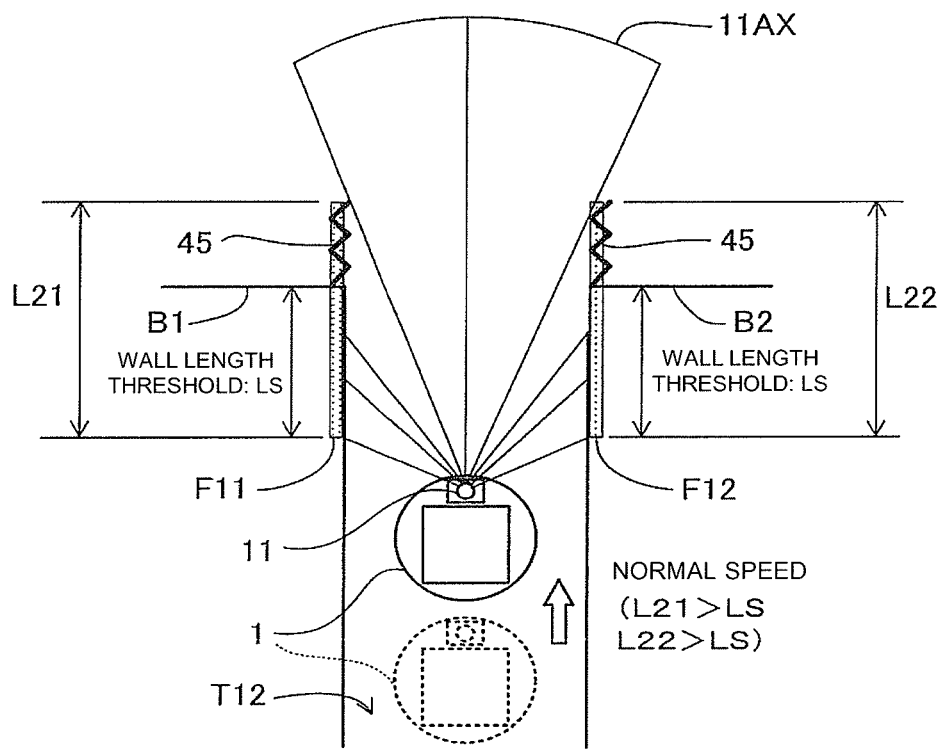
FIG. 11 is a view for explaining an example in which the autonomous travel cart travels the narrow path when a fixed obstacle is disposed at an exit of the narrow path.

In a case where the narrow path T12 are extended by partitions 45, which are not included in the designated area map information 42V and arranged in the exit end of the narrow path T12, due to the change of the layout of the designated area 42R (travel area), as shown in FIG. 11, the ECU 41 generates the surroundings information of a fan-shaped range having a radius of about 10 m and a central angle of about 120 degrees on the front side of the autonomous travel cart 1 including information of the shape of the shelves B1, B2 (fixed obstacles) and the partitions 45 (fixed obstacles).

Then, based on the surroundings information, the ECU 41 calculates the respective wall lengths L21 and L22 of the wall portions F11 and F12, which are located on both sides in the vehicle width direction and on the front side of the autonomous travel cart, and formed by the shelves B1, B2 (fixed obstacles) and the partitions 45 (fixed obstacles), from the autonomous travel cart 1 to the exit end of the narrow path T12. Since a spot where a laser beam has hit each of the partitions 45 is always at the same position, the ECU 41 determines that the partitions 45 are fixed obstacles, and sets the wall portions F11 and F12. After adding the partitions 45 (fixed obstacles) to the designated area map information 42V, the ECU 41 re-determines the travel route R1, which is previously determined at Step S14, from the current position P01 to the target arrival position PT again, and stores the travel route R1 in the storage device 42.

Subsequently, the ECU 41 determines that the wall lengths L21 and L22 of the respective wall portions F11 and F12, which are located on both sides of the autonomous travel cart 1 in the vehicle width direction thereof and on the front side of the autonomous travel cart 1, and formed by the shelves B1, B2 (fixed obstacles) and the partitions 45, are greater than the predetermined wall length threshold LS (for example, about 5 meter). As a result, the ECU 41 causes the autonomous travel cart 1 to travel autonomously at the normal speed (e.g., about 4 km/h) by controlling the right motor 35R and the left motor 35L while updating the current position P01 in the narrow path T12 and avoiding the shelves B1, B2 (fixed obstacles) and the partitions 45 (fixed obstacles).

Referring to FIG. 6, when the ECU 41 determines that at least one of the wall lengths L of the wall portions F1 and F2, which are located on both sides of the autonomous travel cart 1 in the vehicle width direction thereof and on the front side of the autonomous travel cart 1, and formed by the shelves B1, B2 (fixed obstacles), from the autonomous travel cart 1 to the exit end of the narrow path T12, is equal to or less than the predetermined wall length threshold LS (e.g., about 5 meter) (NO at Step S104), ECU 41 proceeds to Step S106.

At Step S106, the ECU 41 causes the autonomous travel cart 1 to decelerate to a reduced speed (e.g., about 1 km/h) and travel autonomously at the reduced speed along the travel route R1, or R2 while updating the current position P01 in the narrow path T12 and avoiding the shelves B1, B2 (fixed obstacles) by controlling the right motor 35R and the left motor 35L, and proceeds to Step S107. It is noted that the reduced speed (e.g., about 1 km/h) is stored in the ROM of the ECU 41, or the storage device 42. The ECU 41 serves as the narrow path travel control unit of the present disclosure.

At Step S107, the ECU 41 causes the audio output device 33 (e.g., a speaker) to provide an audio guidance notifying that the autonomous travel cart 1 is travelling towards the exit of the narrow path T12, and proceeds to Step S108. This permits notifying a person who is moving near the exit of the narrow path T12 (moving obstacle) even if a person (moving obstacle) is in a blind area where it cannot be detected by the obstacle detection device 11. The ECU 41 serves as the notification control unit of the present disclosure.

Figure 9:
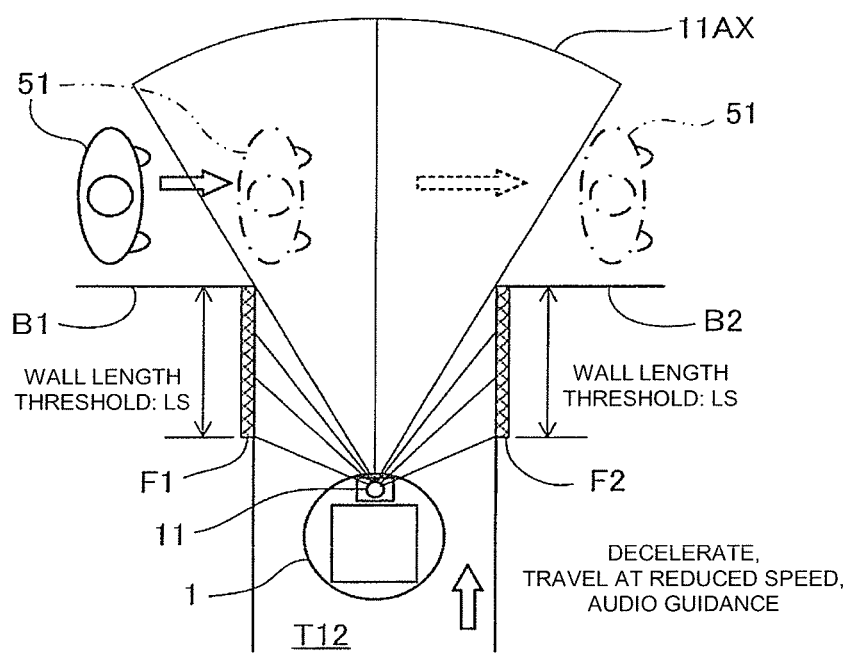
FIG. 9 is a view for explaining an example in which the autonomous travel cart travels the narrow path.

For example, as shown in FIG. 9, the ECU 41 generates the surroundings information of a fan-shaped range having a radius of about 10 meter and a central angle of about 120 degrees on the front side of the autonomous travel cart 1, including information of the shape of the shelves B1, B2 (fixed obstacles) and the partitions 45 (fixed obstacles) based on the detection information in the obstacle detection planer region 11AX input from the obstacle detection device 11. Then, the ECU 41 calculates the wall lengths L of the respective wall portions F1, F2, which are located on both sides of the autonomous travel cart 1 in the vehicle width direction thereof and on the front side of the autonomous travel cart 1, and formed by the shelves B1, B2 (fixed obstacles), from the autonomous travel cart 1 to the exit end of the narrow path T12 based on the generated surroundings information. Thus, the ECU 41 determines that the wall lengths L are substantially equal to the predetermined wall length threshold LS (e.g., about 5 meter).

As a result, the ECU 41 causes the autonomous travel cart 1 to decelerate to the reduced speed (e.g., about 1 km/h) and travel autonomously at the reduced speed (e.g., about 1 km/h) along the travel route R1, or R2 while updating the current position P01 in the narrow path T12 and avoiding the shelves B1, B2 (fixed obstacles) by controlling the right motor 35R and the left motor 35L. In addition, the ECU 41 causes the audio output device 33 (e.g., a speaker) to provide an audio guidance notifying that the autonomous travel cart 1 is travelling towards the exit of the narrow path T12. This permits notifying a person 51 who is moving around the exit of the narrow path T12 (moving obstacle) even if a person (moving obstacle) 51 is in a blind area where it cannot be detected by the obstacle detection device 11.

Figure 10:
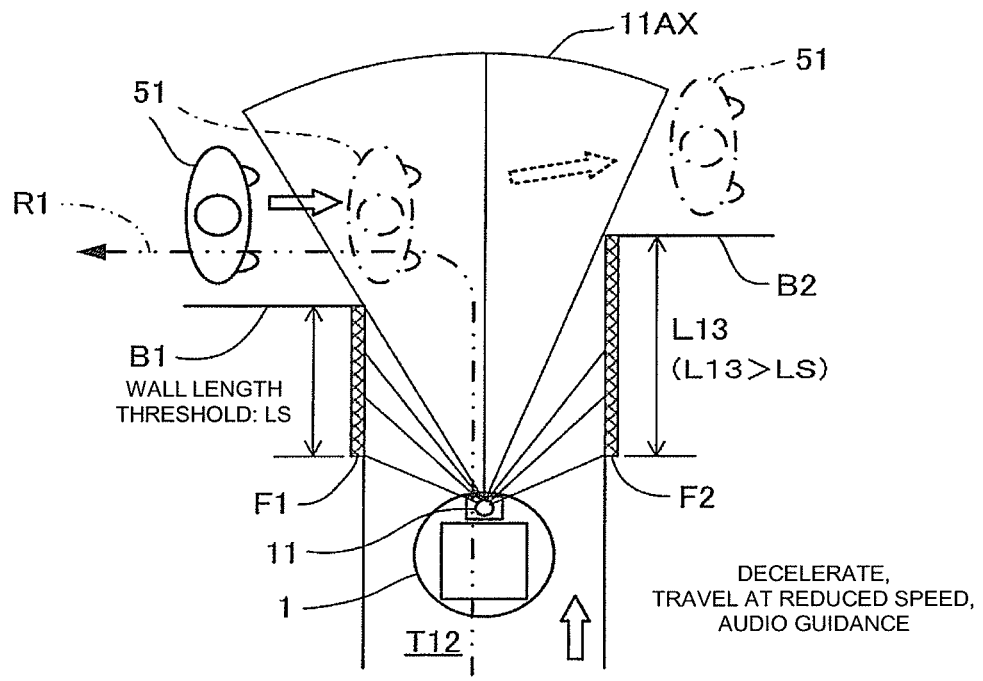
FIG. 10 is a view for explaining an example in which the autonomous travel cart travels the narrow path.

For example, as shown in FIG. 10, the ECU 41 generates the surroundings information of a fan-shaped range having a radius of about 10 meter and a central angle of about 120 degrees on the front side of the autonomous travel cart 1, including information of the shape of the shelves B1, B2 (fixed obstacles) from the detection information in the obstacle detection planer region 11AX input from the obstacle detection device 11. Subsequently, the ECU 41 calculates the wall lengths L of the respective wall portions F1, F2, which are located on both sides of the autonomous travel cart 1 in the vehicle width direction thereof and on the front side of the autonomous travel cart 1, and formed by the shelves B1, B2 (fixed obstacles), from the autonomous travel cart 1 to the exit end of the narrow path T12 based on the surroundings information.

The ECU 41 determines that the wall length L of the wall portion F1 formed by the shelf B1 is substantially equal to the predetermined wall length threshold LS (e.g., 5 meter). In addition, the ECU 41 determines that the wall length L of the wall portion F2 formed by the shelf B2 is at the wall length L13 that is greater than the predetermined wall length threshold LS (e.g., 5 meter). Since one of the wall lengths L of the wall portions F1, F2, specifically, the wall length L of the wall portion F1, is equal to or less than the predetermined wall length threshold LS (e.g., 5 meter), the ECU 41 causes the autonomous travel cart 1 to reduce its travelling speed to a reduced speed (e.g., 1 km/h) and travel autonomously along the travel route R1, or R2 while updating the current position P01 in the narrow path T12 and avoiding the shelves B1, B2 (fixed obstacles) by controlling the right motor 35R and the left motor 35L.

In addition, the ECU 41 causes the audio output device 33 (e.g., a speaker) to provide an audio guidance notifying that the autonomous travel cart 1 is travelling towards the exit of the narrow path T12. This permits notifying a person 51 who is moving near the exit of the narrow path T12 (moving obstacle) even if a person (moving obstacle) 51 is in a blind area where it cannot be detected by the obstacle detection device 11.

In a case where the narrow path T12 are extended by partitions 45, which are not included in the designated area map information 42V and arranged in the exit end of the narrow path T12, due to the change of the layout of the designated area 42R (travel area), as shown in FIG. 11, the ECU 41 generates the surroundings information of a fan-shaped range having a radius of about 10 meter and a central angle of about 120 degree on the front side of the autonomous travel cart 1, including information of the shape of the shelves B1, B2 (fixed obstacles) and the partitions 45 (fixed obstacles).

The ECU 41 calculates the wall lengths L of the wall portions F11, F12, which are located on both sides of the autonomous travel cart in the vehicle width direction thereof and on the front side of the autonomous travel cart 1, and formed by the shelves B1, B2 (fixed obstacles) and the partitions 45 (fixed obstacles). The ECU 41 determines that the wall lengths L of the respective wall portions F11 and F12 are substantially equal to the predetermined wall length threshold LS (e.g., about 5 meter), The ECU 41 causes (controls) the autonomous travel cart 1 to decelerate to a reduced speed (e.g., about 1 km/h) and travel autonomously at the reduced speed (e.g., about 1 km/h) towards the exit of the narrow path T12, i.e., the exit of the partitions 45 (fixed obstacles), while updating the current position P01 in the narrow path T12 and avoiding the shelves B1, B2 (fixed obstacles) and the partitions 45 by controlling the right motor 35R and the left motor 35L. Additionally, the ECU 41 causes the audio output device 33 (e.g., a speaker) to provide an audio guidance notifying that the autonomous travel cart 1 is travelling towards the exit of the narrow path T12. This permits notifying a person 51 who is moving near the exit of the narrow path T12 (moving obstacle) even if a person (moving obstacle) 51 is in a blind area where it cannot be detected by the obstacle detection device 11.

Subsequently, at Step S108, the ECU 41 generates the surroundings information of a fan-shaped range having a radius of about 10 m and a central angle of about 120 degrees on the front side of the autonomous travel cart 1, including information of the shape of the shelves B1, B2 (fixed obstacles) located on the front side of the autonomous travel cart 1 from the detection information of the obstacle detection flat region 11AX input from the obstacle detection device 11. The ECU 41 determines whether or not a person (moving obstacle) is in the obstacle detection flat region 11AX, that is, whether or not a person (moving obstacle) moves around the exit of the narrow path 12 based on the surroundings information.

For example, when the width of the person 51 is 60 centimeter as viewed from the front, and is 30 centimeter as viewed from the side, as shown in FIG. 9, it may be assumed that the person 51 is moving around the exit of the narrow path T12 if the detected object in the obstacle detection flat region 11AX has the width of 30 to 60 centimeter. The person 51 has the width between 30 centimeter and 60 centimeter is stored, for example, in the storage device 42 in advance. The ECU 41 determines that the person 51 is a moving obstacle because the spot where a laser beam has hit the person 51 is not always at the same position.

When it is determined that a person (moving obstacle) is not in the obstacle detection flat region 11AX, that is, the person (moving obstacle) is not moving around the exit of the narrow path T12 (NO at Step S108), the ECU 41 proceeds to Step S112, which will be described later.

On the other hand, when it is determined that a person (moving obstacle) is in the obstacle detection flat region 11AX, that is, the person (moving obstacle) is moving around the exit of the narrow path T12 (NO at Step S108), the ECU 41 proceeds to Step S109. At Step S109, the ECU 41 stops driving of the right motor 35R and the left motor 35L to stop traveling of the autonomous travel cart 1, and proceeds to Step S110.

At Step S110, the ECU 41 generates the surroundings information of a fan-shaped range having a radius of about 10 m and a central angle of about 120 degrees of the front side of the autonomous travel cart 1 based on the detection information input from the obstacle detection device 11. Then, the ECU 41 determines whether or not a person (moving obstacle) has left the obstacle detection flat region 11AX, that is, whether or not the person (moving obstacle) has passed the exit of the narrow path T12.

When it is determined that the person (moving obstacle) is in the obstacle detection flat region 11AX, that is, when it is determined that the person (moving obstacle) is passing the exit of the narrow path T12 (NO at Step S110), the ECU 41 executes Step S110 and subsequent Steps again. In other words, the ECU 41 waits for the person (moving obstacle) to pass the exit of the narrow path T12. The audio output device 33 may continue to provide an audio guidance notifying that the autonomous travel cart 1 is travelling towards the exit of the narrow path T12. When it is determined that the person (moving obstacle) has left the obstacle detection flat region 11AX, that is, when it is determined that the person (moving obstacle) has passed the exit of the narrow path T12, or the moving obstacle does not exist around the exit of the narrow path T12 (YES at Step S110), the ECU 41 proceeds to step S111.

At Step S111, the ECU 41 causes the audio output device 33 to provide an audio guidance notifying that the autonomous travel cart 1 is travelling towards the exit of the narrow path T12. In addition, the ECU 41 causes the autonomous travel cart 1 to restart travelling autonomously at a reduced speed (e.g., about 1 km/h) towards the exit of the narrow path t12 while updating the current position P01 in the narrow path T12 and avoiding the shelves B1, B2 (fixed obstacles) by controlling the right motor 35R and the left motor 35L, and proceeds to Step S112.

Figure 12:
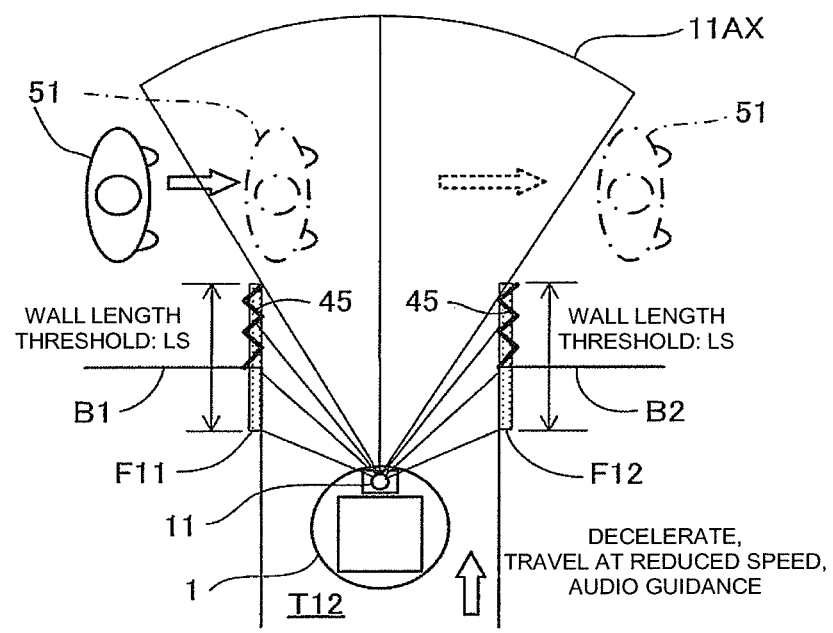
FIG. 12 is a view for explaining an example in which the autonomous travel cart travels a narrow path when a fixed obstacle is disposed at an exit of the narrow path.

For example, as shown in FIGS. 9, 10, and 12, when the ECU 41 detects a person 51 (moving obstacle) in the obstacle detection flat region 11Ax while providing an audio guidance notifying that the autonomous travel cart 1 is travelling towards the exit of the narrow path T12 through the audio output device 33 and travelling autonomously at a reduced speed (e.g., about 1 km/h) by controlling the right motor 35R and the left motor 35L, the ECU 41 stops driving of the right motor 35R and the left motor 35L to stop the autonomous travel cart 1.

Then, the ECU 41 waits for the person 51 to move out of the obstacle detection flat region 11AX with the driving of the right motor 35R and the left motor 35L stopped. The ECU 41 may cause the audio output device 33 to continue providing an audio guidance notifying that the autonomous travel cart 1 is travelling towards the exit of the narrow path T12. Then, when the person 51 move out of the obstacle detection flat region 11AX, the ECU 41 causes the autonomous travel cart 1 to restart the autonomous travel at a reduced speed (e.g., about 1 km/h) towards the exit of the narrow path T12 by controlling the right motor 35R and the left motor 35L while providing an audio guidance notifying that the autonomous travel cart 1 is travelling towards the exit of the narrow path T12.

Subsequently, at Step S112, the ECU 41 generates the surroundings information of a fan-shaped range having a radius of about 10 meter and a central angle of about 120 degrees on the front side of the autonomous travel cart 1 based on the detection information input from obstacle detection device 11. Then, the ECU 41 determined whether or not the wall portions F1 and F2 (see FIG. 9) or the wall portions F11 and F12 (see FIG. 12) formed by the shelves B1 and B2 (fixed obstacles) (see FIG. 4) and the partitions 45 (fixed obstacles) (see FIG. 12) are no longer detected in the obstacle detection flat region 11AX, that is, whether or not the autonomous travel cart 1 has passed the narrow path T12. It is noted that the ECU 41 may be configured to determine whether or not the autonomous travel cart 1 has passed the narrow path T12 by determining whether or not the wall portion F1 of the wall portions F1, F2 that is disposed on the traveling direction side along the travel route R1 is no longer detected.

When it is determined that the wall portions F1 and F2 (see FIG. 9) and the wall portions F11 and F12 (see FIG. 12) formed by the shelves B1 and B2 (fixed obstacles) (see FIG. 4) and the partitions 45 (fixed obstacles) (see FIG. 12) are detected, that is, the autonomous travel cart 1 has not passed the narrow path T12 (NO at Step S112), the ECU 41 ends the sub-process and returns to the main process.

When it is determined that the wall portions F1 and F2 (see FIG. 9) and the wall portions F11 and F12 (see FIG. 12) formed by the shelves B1 and B2 (fixed obstacles) (see FIG. 4) and the partitions 45 (fixed obstacles) (see FIG. 12) are not detected, that is, the autonomous travel cart 1 has passed the narrow path T12 (YES at Step S112), the ECU 41 proceeds to Step S113. The ECU 41 may be configured to proceed to Step S113 when it is determined that the wall portion F1 of the wall portions F1, F2 that is disposed on the traveling direction side along the travel route R1 is not detected, that is, the autonomous travel cart 1 has passed the narrow path T12. Thus, the ECU 41 serves as the narrow path passing determination unit of the present disclosure.

At Step S113, the ECU 41 accelerate the autonomous travel cart 1 to a normal speed (e.g., about 4 km/h) by controlling the right motor 35R and the left motor 35L. The ECU 41 sets (controls) the autonomous travel cart 1 to travel autonomously at a normal speed (e.g., about 4 km/h) along the routes R1, R2, and proceeds to Step S114. Thus, the ECU 41 serves as the narrow path passed travel control unit. At Step S114, the ECU 41 stops providing an audio guidance notifying that the autonomous travel cart 1 is travelling towards the exit of the narrow path T12 by the audio output device 33 (e.g., speaker), ends the sub-process, and returns to the main process.

As has been described in detail, when the autonomous travel cart 1 enters the narrow path T12, the autonomous travel cart 1 according to the present embodiment travels at the normal speed (e.g., about 4 km/h) until at least one of the wall lengths L of the wall portions F1, F2, which are located on both sides of the autonomous travel cart 1 in the vehicle width direction thereof and on the front side of the autonomous travel cart 1, and formed by the shelves B1, B2 (fixed obstacles), from the autonomous travel cart 1 to the exit end of the narrow path T12 becomes equal to or less than the predetermined wall length threshold LS (e.g., about 5 meter). Then, the ECU 41 controls the autonomous travel cart 1 to decelerate the reduced speed (e.g., about 1 km/h) and travel autonomously at the reduced speed (e.g., about 1 km/h).

Accordingly, the autonomous travel cart 1 can pass the exit of the narrow path T12 safely and quickly without providing magnetic marks or the like on the floor surface in front of the exit of the narrow path T12. Since the autonomous travel cart 1 travels at a normal speed (e.g., about 4 km/h) in the narrow path T12 until at least one of the wall lengths L of the wall portions F1, F2, which are located on both sides of the autonomous travel cart 1 in the vehicle width direction thereof and on the front side of the autonomous travel cart 1, and formed by the shelves B1, B2 (fixed obstacles), from the autonomous travel cart 1 to the exit end of the narrow path T12 becomes equal to or less than the predetermined wall length threshold LS (e.g., about 5 meter), a travel time to reach the target arrival position PT may be reduced, with the result that the work efficiency may be increased.

Even in a case where the narrow path T12 are extended by the provision of unexpected obstacle in the exit of the narrow path T12, e.g., the partitions 45, due to the change of the layout of the designated area 42R (travel area), the ECU 41 configured to control the autonomous travel cart 1 to travel at the normal speed (e.g., about 4 km/h) in the narrow path T12 until at least one of the wall lengths L of the wall portions F1 and F2 (see FIG. 11) from the autonomous travel cart 1 to the exit end of the narrow path T12, i.e., the end of the partitions 45 in the vehicle travelling direction, becomes equal to or less than the predetermined wall length threshold LS. Then, the ECU 41 controls the autonomous travel cart 1 to decelerate to and travel at the predetermined reduced speed. This allows the autonomous travel cart 1 to pass the exit of the narrow path T12 safely and swiftly without increasing the reduced speed travel distance in the narrow path T12.

When the person 51 (moving obstacle) exists around the exit of the narrow path T12 while the autonomous travel cart 1 is travelling at the predetermined reduced speed (e.g., about 1 km/h), the ECU 41 controls the autonomous travel cart 1 to stop, and to restart travelling at the predetermined reduced speed after such person 51 (moving obstacle) moving out of the exit of the narrow path T12. Since the autonomous travel cart 1 stop travelling when the person 51 (moving obstacle) is around the exit of the narrow path T12, a contact of the autonomous travel cart 1 with the person 51 (moving obstacle) at the exit of the narrow path T12 may be reliably avoided. The ECU 41 serves as the moving obstacle determination unit and as the avoidance travel control unit of the present disclosure.

In addition, the ECU 41 controls the autonomous travel cart 1 to travel at a normal speed (for example, 4 km/h) by controlling the driving of the right motor 35R and the left motor 35L after the autonomous travel cart 1 having passed through the narrow path T12, so that the travel time to reach the target arrival position PT (items collection location) may be reduced, and the work efficiency can be improved.

The ECU 41 causes the audio output device 33 (e.g., a speaker) to provide an audio guidance notifying that the autonomous travel cart 1 is travelling towards the exit of the narrow path T12 when one of the wall lengths L of the wall portions F1, F2 becomes equal to or less than the predetermined wall length threshold LS (e.g., 5 meter) until the autonomous travel cart 1 passes the exit of the narrow path T12. This permit alerting the person 51 moving near the exit of the narrow path T12 even if the person 51 is in a blind area near the exit of the narrow path T12 where it cannot be detected by the obstacle detection device 11.

The autonomous travel cart 1 of the present disclosure is not limited to the above-described configuration, structure, shape, and process, but may be modified, added or omitted in various manners within the scope of the present disclosure. In the following description, the same reference numerals as those in the autonomous travel cart 1 according to the above embodiment in FIGS. 1 to 12 denote the same or equivalent portions.

(A) The embodiment of the present disclosure may be modified so that a deceleration region 48 having a substantially rectangular shape in plan view may be set and registered in advance along the route of the narrow path T12 in the designated area map information 42V so as to cover the opposite ends of the narrow path T12 and portions around the opposite ends of the narrow path T12. Thus, the ECU 41 generates surroundings information of a fan-shaped range having a radius of about 10 meter and a central angle of about 120 degree in front of the autonomous travel cart 1, from the detection information input from the obstacle detection device 11 at Step S103. In this case, the ECU 41 determines the current position P01 in the narrow path T12 based on this surroundings information and the designated area map information 42V stored in the storage device 42.

Subsequently, at Step S104, the ECU 41 determines whether or not the current position P01 is located out of the deceleration region 48, that is, whether or not the autonomous travel cart 1 has yet to enter the deceleration region 48, based on the current position P01 in the narrow path T12 and the designated area map information 42V.

When the ECU 41 determines that the current position P01 of the autonomous travel cart 1 is located out of the deceleration region 48 (YES at Step S104), that is, the ECU 41 determines that the autonomous travel cart 1 has yet to enter the deceleration region 48, the ECU 41 proceeds to Step S105. When the ECU 41 determines that the current position P01 of the autonomous travel cart 1 is located not out of the deceleration region 48 (NO at Step S104), that is, the ECU 41 determines that the autonomous travel cart 1 has entered the deceleration region 48, the ECU 41 proceeds to Step S106.

As a result, when the autonomous travel cart 1 enters the narrow path T12, the ECU 41 causes the autonomous travel cart 1 to travel at the normal speed (e.g., about 4 km/h) until the autonomous travel cart 1 enters the deceleration region 48. Once the autonomous travel cart 1 enters the narrow path T12, the ECU 41 causes the autonomous travel cart 1 to decelerate and travel at the predetermined reduced speed (for example, about 1 km/h). Thus, there is no need to provide magnetic marks or the like on the floor surface in front of the exit of the narrow path T12 for the autonomous travel cart 1 to pass the exit of the narrow path T12 safely and swiftly. Since the autonomous travel cart 1 travels in the narrow path T12 at the normal speed (e.g., about 4 km/h) until the autonomous travel cart 1 enters the deceleration region 48, the travel time to reach the target arrival position PT may be reduced, with the result that the work efficiency may be increased.

Even in the case where the narrow path T12 are extended by the provision of unexpected obstacle in the exit of the narrow path T12, e.g., the partitions 45, due to the change of the layout of the designated area 42R (travel area), the ECU 41 causes the autonomous travel cart 1 to travel at the normal speed (e.g., about 4 km/h) in the narrow path T12 until the current position P01 of the autonomous travel cart 1 enters the deceleration region 48. Then, the autonomous travel cart 1 decelerates to the predetermined reduced speed (e.g., about 1 km/h) and travels at the predetermined reduced speed (e.g., about 1 km/h) once the current position P01 of the autonomous travel cart 1 enters the deceleration region 48. This allows the autonomous travel cart 1 to pass the exit of the narrow path T12 safely and swiftly without increasing the reduced speed travel distance in the narrow path T12.

(B) In addition, the two-dimensional planar obstacle-detection region 11AX may be replaced with a three-dimensional planar obstacle-detection region 11B where a plurality laser beams is scanned in overlapping manner. For example, the three-dimensional planar obstacle-detection region 11B may be realized by disposing four obstacle detection flat regions 11AX so that the inclination angle is set to zero with respect to the horizontal direction, the inclination angle is set to $\Delta\theta$ downwardly with respect to the horizontal direction, the inclination angle is set to $\Delta\theta \times 2$ downwardly with respect to the horizontal direction, or the inclination angle is set to $\Delta\theta \times 3$ downwardly with respect to the horizontal direction, and scanning such obstacle detection flat regions 11AX having each inclination angle. This permits detecting the wall portions F1, F2 and the like in three dimensions, which improves the measurement precision for the wall lengths L11 and L12 and the like.

(C) Although one obstacle sensor (LRF (laser range finder) sensor) having a two-dimensional planar obstacle detection flat region scanned with a laser beam is used as the obstacle detection device 11 in the above-described embodiment, two or more obstacle sensors may be used to improve measurement precision. In addition, the obstacle detection device 11 is not limited to the LRF sensor, but may be provided by a sensor such as a millimeter wave sensor, an ultrasonic sensor, or a stereo camera may be used.

What is claimed is:

1. An autonomous travel cart travelling autonomously in accordance with a travel route, the autonomous travel cart comprising:
   an obstacle detection device having a two-dimensional planer obstacle detection flat region where a laser beam is scanned, and outputting a detection information including an obstacle position which is a position of an obstacle in the obstacle detection flat region; and
   a control device controlling the autonomous travel cart to travel autonomously based on the detection information from the obstacle detection device, wherein the control device includes:
   a surroundings information acquisition unit that acquires a surroundings information around the autonomous travel cart in the front thereof based on the detection information input from the obstacle detection device;
   an entrance determination unit that determines whether or not the autonomous travel cart has entered a narrow path in which fixed obstacles are disposed on both sides of the autonomous travel cart in the width direction thereof based on the surrounding information acquired by the surrounding information acquisition unit;
   a wall length detection unit that detects wall lengths of wall portions from the autonomous travel cart to an exit end of the narrow path, the wall portions being formed by the fixed obstacles disposed on both sides of the autonomous travel cart in the width direction thereof, when the entrance determination unit determines that the autonomous travel cart has entered the narrow path;
   a wall length determination unit that determines whether or not the respective wall lengths detected by the wall length detection unit are greater than a predetermined wall length threshold; and
   a narrow path travel control unit that controls the autonomous travel cart to travel at a normal speed when the wall length determination unit determines that the wall lengths detected by the wall length detection unit are greater than the predetermined wall length threshold, and controls the autonomous travel cart to decelerate and travel at a predetermined reduced speed when the wall length determination unit determines that at least one of the wall lengths detected by the wall length detection unit is equal to or less than the predetermined wall length threshold.

2. The autonomous travel cart according to claim 1, wherein
   the control device includes:
   a moving obstacle determination unit that determines whether or not a moving obstacle including a person is around an exit of the narrow path based on the surroundings information acquired by the surroundings information acquisition unit; and
   an avoidance travel control unit that controls the autonomous travel cart to stop when the moving obstacle determination unit that determines that the moving obstacle is around the exit of the narrow path while the autonomous travel cart is controlled to travel at the predetermined reduced speed by the narrow path travel control unit, and controls the autonomous travel cart to restart and travel at the predetermined reduced speed when the moving obstacle determination unit determines that the moving obstacle does not exist around the exit of the narrow path.

3. The autonomous travel cart according to claim 1, wherein
   the control device includes:
   a narrow path passing determination unit that determines whether or not the autonomous travel cart has passed the narrow path; and
   a narrow path passed travel control unit that controls the autonomous travel cart to travel at the normal speed when the narrow path passing determination unit that determines that the autonomous travel cart has passed the narrow path.

4. The autonomous travel cart according to claim 1, wherein
- the autonomous travel cart includes an audio output device that provides an audio guidance,
- the control device includes a notification control unit that controls the audio output device to provide the audio guidance notifying that the autonomous travel cart is travelling towards an exit of the narrow path until the autonomous travel cart passes the exit of the narrow path when the wall length determination unit determines that at least one of the wall lengths detected by the wall length detection unit is equal to or less than the predetermined wall length threshold.

* * * * *

UNITED STATES PATENT AND TRADEMARK OFFICE
CERTIFICATE OF CORRECTION

PATENT NO. : 11,237,568 B2
APPLICATION NO. : 16/559969
DATED : February 1, 2022
INVENTOR(S) : Nakashima et al.

It is certified that error appears in the above-identified patent and that said Letters Patent is hereby corrected as shown below:

In the Claims

Column 19, Line 60 please change "planer" to -- planar --

Signed and Sealed this
Fifth Day of July, 2022

Katherine Kelly Vidal
*Director of the United States Patent and Trademark Office*